US009649774B2

(12) United States Patent
Kollman

(10) Patent No.: US 9,649,774 B2
(45) Date of Patent: May 16, 2017

(54) METHOD AND MACHINE FOR CUTTING BLINDS

(75) Inventor: Michael Kollman, Fitchburg, WI (US)

(73) Assignee: Lumino, Inc., Madison, WI (US)

( * ) Notice: Subject to any disclaimer, the term of this patent is extended or adjusted under 35 U.S.C. 154(b) by 1942 days.

(21) Appl. No.: 12/349,035

(22) Filed: Jan. 6, 2009

(65) Prior Publication Data

US 2010/0170375 A1 Jul. 8, 2010

(51) Int. Cl.

| | |
|---|---|
| ***B26D 7/04*** | (2006.01) |
| ***E06B 9/266*** | (2006.01) |
| ***B23D 23/00*** | (2006.01) |

(52) U.S. Cl.

CPC ................ *B26D 7/04* (2013.01); *E06B 9/266* (2013.01); *Y10T 29/39* (2015.01); *Y10T 83/04* (2015.04); *Y10T 83/7487* (2015.04); *Y10T 83/7647* (2015.04); *Y10T 83/849* (2015.04)

(58) Field of Classification Search

CPC .. B26D 7/02–7/04; E06B 9/266; B23D 23/00; Y10T 29/39; Y10T 83/849; Y10T 83/04; Y10T 83/7487; Y10T 83/7647; Y10T 83/858; Y10T 83/75; Y10T 83/76

USPC ............. 83/466, 466.1, 451–468.94, 522.11, 83/522.14, 554, 379, 377, 381, 387; 269/246, 249, 60, 43, 254 CS

See application file for complete search history.

(56) References Cited

U.S. PATENT DOCUMENTS 2,522,965 A * 9/1950 Schaufelberger ............... 83/409
4,169,400 A * 10/1979 Ducret ............................ 83/409
4,807,363 A * 2/1989 Clifton, Jr. ...................... 30/242
5,799,557 A 9/1998 Wang
5,816,126 A 10/1998 Pluber
5,927,172 A 7/1999 Wang
6,089,134 A 7/2000 Marocco
6,170,372 B1 * 1/2001 Weaver ........................... 83/477
6,178,857 B1 1/2001 Marocco
6,202,530 B1 * 3/2001 Cawley ........................... 83/879
6,334,379 B1 1/2002 Sudano
6,412,381 B1 7/2002 Wang et al.
6,427,571 B1 8/2002 Hsu
6,644,160 B1 * 11/2003 Boselli ............................ 83/518
6,761,099 B2 7/2004 Lin et al.
6,860,312 B2 3/2005 Judkins
6,945,152 B2 9/2005 Jabbari et al.
7,024,977 B2 4/2006 Nlen
7,137,326 B2 * 11/2006 Gass et al. ........................ 83/58
7,353,856 B2 4/2008 Pon et al.

(Continued)

*Primary Examiner* — Laura M Lee

(74) *Attorney, Agent, or Firm* — Buchanan Ingersoll & Rooney PC

(57) ABSTRACT

A method and machine for cutting woven wood blinds is disclosed. The disclosed machine can include a cutting mechanism, a support surface adjacent at least one opening in the cutting mechanism housing, a spring loaded clamp which engages the woven wood blind to hold the blind securely for cutting without damaging the blind. The clamp is preferably operated by a hand screw. An indicator such as a collar attached to the hand screw is provided to tell the user when the clamp is positioned to provide the desired pressure. The disclosed method can include positioning a window covering into a cutting machine, positioning a first cutting support member on the window covering, moving a clamp to engage the first cutting support member and cutting the window covering.

10 Claims, 6 Drawing Sheets

(56) References Cited

U.S. PATENT DOCUMENTS

| | | | |
|---|---|---|---|
| 2002/0020506 A1 | 2/2002 | Dekker et al. | |
| 2003/0070522 A1* | 4/2003 | Huang | 83/474 |
| 2006/0156882 A1 | 7/2006 | Kollman et al. | |
| 2007/0000363 A1 | 1/2007 | Kollman et al. | |
| 2007/0175782 A1 | 8/2007 | Nien | |
| 2007/0175783 A1 | 8/2007 | Nien | |

* cited by examiner

METHOD AND MACHINE FOR CUTTING BLINDS

FIELD OF INVENTION

The present invention relates to blind cutting machines and methods of cutting or trimming blinds, particularly woven wood and woven grass blinds.

BACKGROUND OF INVENTION

Woven wood blinds have recently grown in popularity. Such blinds contain strips or sticks of wood or faux wood or lengths of grass or grasses laid side by side and woven together to form a panel. The panel of woven wood or grass extends from a board or headrail and may be raised or lowered by a lift mechanism. Typically the lift mechanism is comprised of a set of cords that pass through a cord lock. In a roll-up shade, each cord runs from the headrail down the one side of the panel and up the other side. In a roman shade, the lift cords run behind the panel from a point near the bottom of the shade to and through the cord lock. Examples of such blinds are disclosed in U.S. Pat. Nos. 7,353,856, 6,860,312 and U.S. Patent Application Publication Nos. 2007/0175783 and 2007/0175782. The phrase "woven wood blinds" is often used to encompass blinds made from strips or sticks of wood or faux wood woven into a panel as well as blinds made from lengths of grass and is used that way herein.

Woven wood blinds are sold in stock sizes by retailers, such as big-box retailers. If a customer wishes to cover a window that has a dimension that differs from the dimension of a stock size blind then he or she must have the woven wood blind custom-made. Such custom sized blinds are often expensive. Typically the process used to make a custom blind involves laying a woven wood panel on a work table and trimming the panel to the desired size using a knife or scissors.

There are other types of window coverings including Venetian blinds, vertical blinds, pleated shades and cellular shades that are also sold in stock sizes. Many retailers have installed machines in retail locations which can be used by a sales associate to cut-down stock size blinds to fit a customer's window. These machines use cutting dies, straight blades or circular blades to cut the blinds. Examples of cutting machines that may cut stock sized blinds are disclosed in U.S. Pat. Nos. 5,799,557, 5,816,126, 5,927,172, 6,178,857, 6,334,379, 6,412,381, 6,427,571, 6,761,099, 6,945,152 and 7,024,977 and U.S. Patent Application Publication Nos. 2008/0087152, 2007/0000363, 2006/0156882 and 2002/0020506.

The machines that have been used to cut down Venetian blinds, vertical blinds, pleated shades and cellular shades are difficult or impossible to use for cutting down woven wood blinds. These blinds cannot be cut with cutting dies. Straight blades or circular blades may not make even cuts or may crack or splinter the blind if the woven wood blind is not securely held. Although clamps have been used to secure other types of blinds in a cut-down machine, clamps are difficult to use on woven wood shades. Woven wood blinds are made from sticks or slats that vary in diameter over the length of the shade and from one woven wood shade to another woven wood shade. Therefore, the height of the stack of one folded or wrapped woven wood blind may be greater or less than the height of another woven wood blind. Additionally, the difference in stick or slat diameter causes some woven wood blinds to compress differently than other woven wood blinds. For these reasons, woven wood shades are difficult to clamp securely and can be easily damaged when clamped. If the middle of a woven wood blind is clamped, the ends of the blind may bulge out. If too much pressure is exerted the wood strips, wood sticks or lengths of glass may split or splinter.

The art has proposed to overcome these problems by tightly wrapping the woven wood blind and then using a circular blade to cut the blind as disclosed in U.S. Patent Application Publication Nos. 2007/0175783 and 2007/0175782. However, this method of cutting woven wood blinds has generally not been adopted by retailers or fabricators of woven wood or woven grass blinds. One problem with wrapped blinds is that they can still flex or change shape during the cutting process which results in an uneven cut.

U.S. Patent Application Publication Nos. 2007/0175783 and 2007/0175782 teach the use of spacer material, such as cardboard, to help alleviate such movement. But the use of spacer material has not solved the problem. Cut edges may be rough or uneven.

Consequently, there is a need for a machine that can cut-down stock sizes of woven wood blinds without cracking or splintering the woven wood panel. The blind must not move during the cutting process and every cut must be accurate. Furthermore, the machine should be capable of use in a retail; store by a sales associate without having received more than an hour of training.

SUMMARY OF THE INVENTION

We provide a window covering cutting machine comprising a cutting mechanism that has a housing with at least one opening sized to receive at least a portion of a window covering, a window covering support surface adjacent the one or more openings, a clamp support positioned adjacent that one or more openings, a hand screw that has a threaded shaft that passes through a threaded opening in the clamp support, a clamp block positioned adjacent the threaded shaft and a spring between the hand screw and the clamp block. The clamp support is positioned a fixed distance from the window covering support surface. The clamp block is moveable relative to the window covering support surface from an unclamped position to a clamping position. The spring is attached between the clamp block and the hand screw such that the spring is compressed when the clamp is moved to the clamping position and the spring expands when the clamp block is moved out of the clamping position.

An indicator may also be connected to at least one of the threaded shaft of the hand screw or the clamp block. The indicator may be a ring, a collar, a disc, of other structure. Preferably, the indicator is connected to the threaded shaft such that the indicator moves into engagement with the clamp block when the clamp block is moved to the clamping position and the indicator moves away from the clamp block when the clamp block is moved to the unclamped position.

One or more end stops can be positioned adjacent to the cutting mechanism. The one or more end stops are movable to adjustably position the end stop or end stops. Preferably, the one or more end stops are configured to brake dynamically to stop movement of the one or more end stops to position the one or more end stops.

I also provide a method of trimming a window covering. My method includes positioning a window covering that includes a panel of woven wood or woven grass folded to form a stack into a cutting machine, positioning a first rigid cutting support member on the top surface of the stack, moving a clamp to a clamping position to engage the first rigid cutting support member to clamp the window covering, and cutting a portion of the window covering.

Embodiments of my method may also include positioning a second rigid cutting support member adjacent the panel such that the second rigid cutting support member is within the folded panel. A third rigid cutting support member may also be positioned below the bottom surface of the stack.

Preferably, the first cutting support member and the window covering are wrapped together. Tape, wrap, a strap, ribbon, a cord, or other elongated member may be wrapped around the first cutting support member and at least a portion of the window covering to wrap the first cutting support member and window covering together.

The one or more rigid cutting support members may include a slat composed of wood or faux wood. They may also include other structures, such as wooden boards, faux wood boards, or other relatively rigid beams, plates, boards or slats.

Other details, objects, and advantages of the invention will become apparent as the following description of certain present preferred embodiments thereof proceeds.

BRIEF DESCRIPTION OF THE DRAWINGS

In the accompanying drawings I have shown certain present preferred embodiments of my window covering cutting machine in which.

DETAILED DESCRIPTION OF PRESENT PREFERRED EMBODIMENTS

Figure 1:
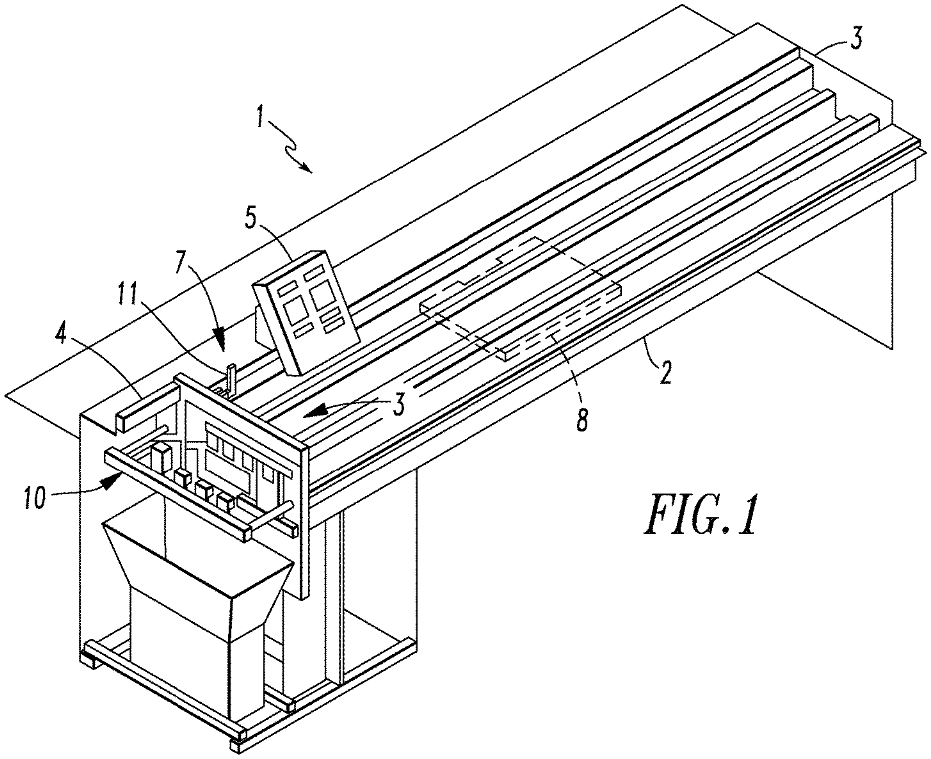
FIG. 1 is a perspective view of a first present preferred cutting machine.

Referring to FIG. 1, a first present preferred embodiment of my blind cutting machine 1 includes a support surface 2 that is sized to support a window covering to be cut down by the machine 1. The machine 1 also includes a cutting mechanism 3 connected to the support surface 2. The cutting mechanism 3 includes a housing 4 that has at least one opening 6, a cutting device 16 and a clamping device 7. The cutting device 16 may be a straight blade or a circular saw blade suitable for trimming a woven wood blind. An end stop 10 is connected to the cutting mechanism 3 and is configured to move to abut an end of a work piece extending through an opening 6 in the cutting mechanism 3. The end stop 10 may be dynamically braked to stop the movement of the end stop 10 when it is positioned to engage a work piece. Preferably, the end stop 10 is actuated by one rod or piston to better facilitate dynamic braking of the end stop 10. A carrier 8 (shown in dotted line in FIG. 1) may be provided on the support surface 2 to hold the blind to be cut. The carrier is sized and configured to securely hold the blind to be cut and to easily move over the support surface.

As may be appreciated from FIGS. 2-7, the clamping device 7 is attached to the housing 4 of the cutting mechanism 3. The clamping device 7 includes a hand screw 11 having a threaded shaft 13 that passes through a threaded opening in a clamp support 9 and a handle 12 that is sized to permit a user to move the handle 12 to rotate the threaded shaft 13. The clamp support 9 is fastened to the housing 4 of the cutting mechanism adjacent an opening 6 in the housing such that the clamp support 9 is positioned a fixed distance from the support surface 2. A clamp block 17 is connected to the threaded shaft 13. Preferably, the clamp block 17 has a cube-like structure so that a rectangular surface **17*a* engages the window covering. It should be understood that the clamp block 17 may be configured to have a structure and clamping surface that are other polygonal shapes or a circular or hemispherical shape. An indicator 15 is also attached to the threaded shaft 13. The indicator 15 may be a collar, a ring, or other object moveably positioned between the clamp block 17 and clamp support 9. A spring 19 extends from within the clamp block 17 to a portion of the threaded shaft 13**.

Figure 2:
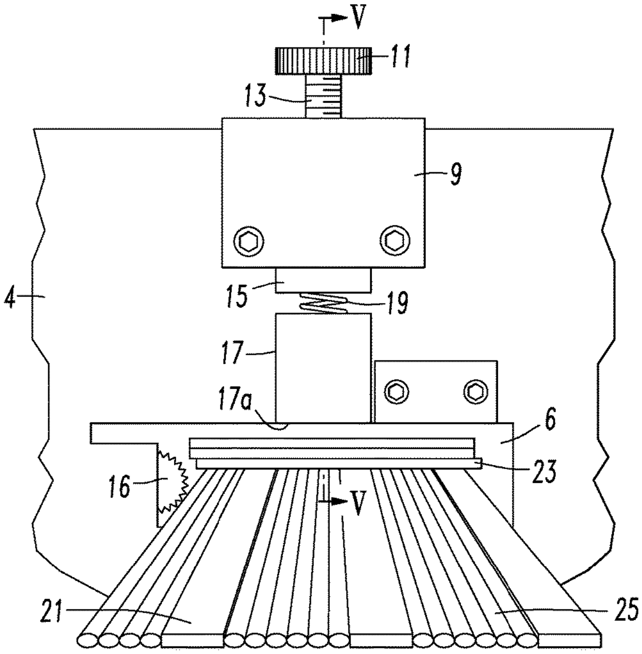
FIG. 2 is a fragmentary view of the first present preferred embodiment illustrating a blind about to be cut and a clamp block in an unclamped position.
Figure 3:
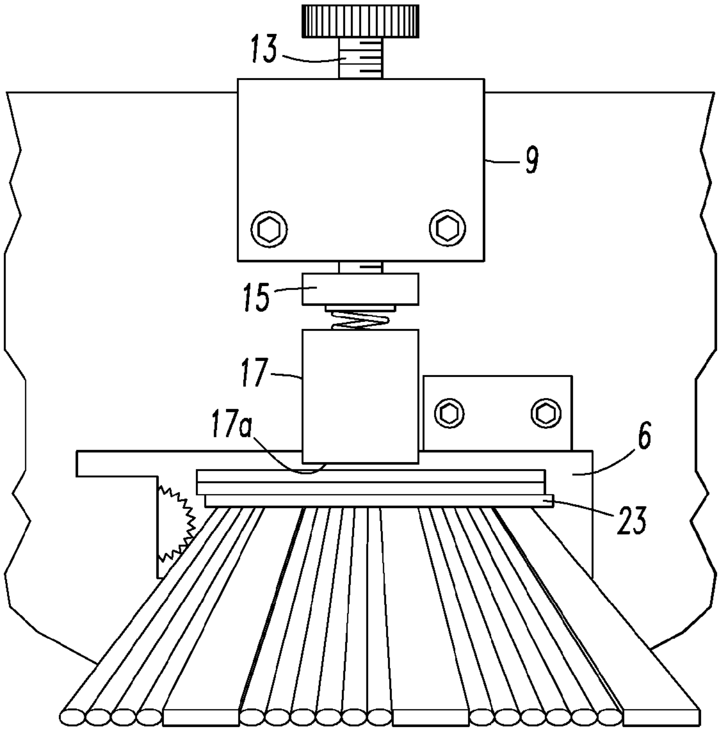
FIG. 3 is a view similar to FIG. 2 illustrating a blind about to be cut and a clamp block in an unclamped position.
Figure 4:
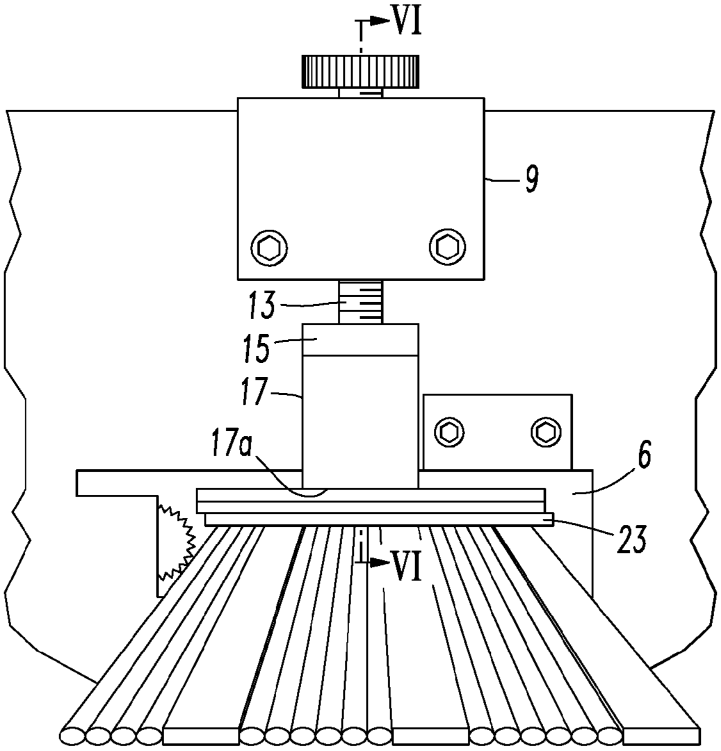
FIG. 4 is a view similar to FIGS. 2 and 3 illustrating a blind about to be cut and a clamp block in a clamping position.

The clamp block 17 is moveable from an unclamped position as shown in FIGS. 2 and 3 to a clamping position, as shown in FIG. 4. Rotation of the hand screw 11 by a user causes the clamp block 17 to move downward to engage a work piece or upwards to move away from a work piece.

As may be appreciated from FIGS. 2-4, the indicator 15 moves as the clamp block 17 is moved from an unclamped position to a clamping position. When the clamp block is in the clamping position, the indicator 15 is positioned next to the clamp block 17 such that the indicator 15 engages the top of the clamp block 17, as shown in FIG. 4. A user may look at the position of the indicator 15 to identify when the clamp block 17 has been positioned in the clamping position. The clamping position is a position at which tile clamp block 17 has engaged the woven wood blind and is applying a desired amount of force which is sufficient to securely hold the blind for cutting but not so large as to crack, chip or otherwise damage the blind.

Figure 5:
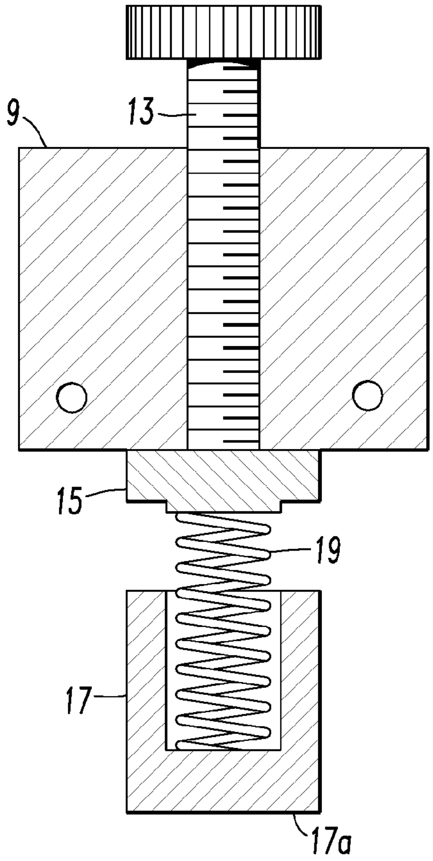
FIG. 5 is a cross sectional view of a present preferred clamping device taken along line V-V in FIG. 2.
Figure 6:
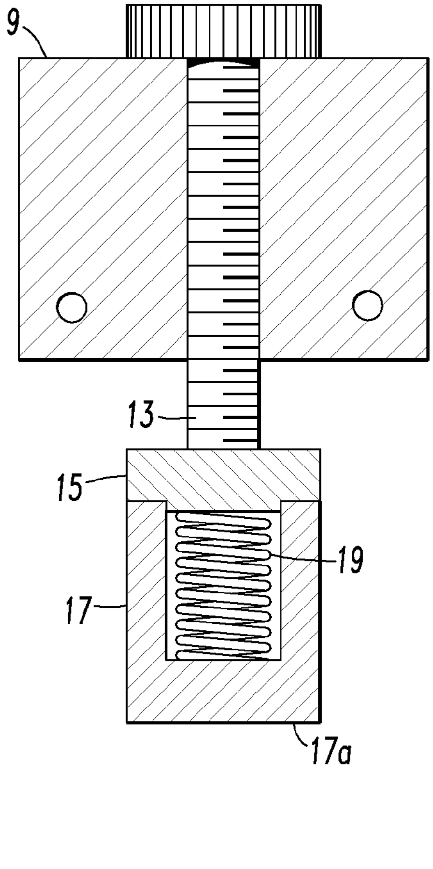
FIG. 6 is a cross sectional view of a present preferred clamping device taken along line VI-VI in FIG. 4.
Figure 7:
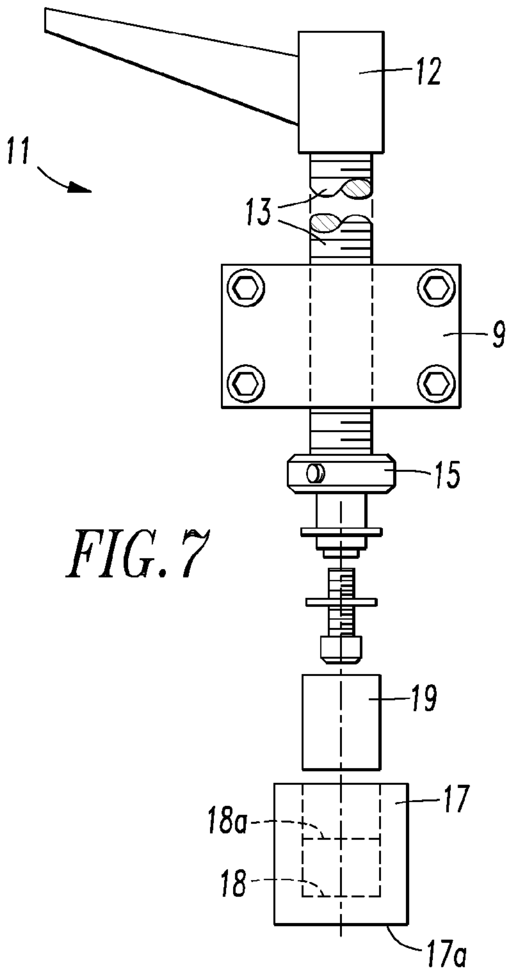
FIG. 7 is an exploded view of a present preferred clamping device.

As may be seen in FIGS. 5, 6 and 7, a spring 19 is connected to and fits within the clamp block 17 and engages indicator 15 on the threaded shaft 13. Movement of the threaded shaft 13 and the clamp block 17 to the clamping position causes the spring 19 to compress and movement of the threaded shaft 13 and the clamp block 17 away from the clamping position causes the spring 19 to stretch. A user positions the woven wood blind 21 to be cut under the clamp as shown in FIG. 2. The user then turns the hand screw 11 until the clamp block engages the blind. Then, the user continues to turn the screw until indicator 15 engages the clamp block 17. Turning the hand screw after the clamp block engages the blind compresses the spring, increasing the pressure of the clamp block 17 on the blind 21. When the indicator 15 engages the clamp block, the spring 19 has been compressed a sufficient amount to provide the desired amount of pressure that will securely hold the blind without damaging the woven wood panel.

As may be appreciated from FIG. 7, the spring 19 fits within a cavity 20 in the clamp block 17 and may be attached to a spring seat 18 within the clamp block 17. The spring seat 18 may be extendable from a first position within the clamp block 17 to other positions within or even outside of the clamp block as shown in dotted line in FIG. 7. By moving the spring seat 18 to different positions, such as position 18*a*, within the clamp block 17 one can adjust the force that is exerted by the clamp block 17. The spring seat 18 and cavity 20 may be threaded to permit such adjustment. An actuator (not shown) may be configured to rotate the spring seat 18 relative to the clamp block to adjust the position of the spring seat 18. One could also adjust the compression force applied by the spring by moving the indicator 15 up or down on the thread shaft.

Although we prefer to use a clamp block, the end of the spring 19 could perform the function of the clamp block. In that embodiment, the spring would directly engage the blind to be cut. Such an embodiment may look like the embodiment shown in FIG. 7, but would not have a clamp block.

Use of the indicator 15 permits a user to easily verify that the proper clamping pressure is being applied to a work piece. The indicator would be a mark on the rod. One could provide a post or strip positioned adjacent the rod with marking on that post or strip that acts as the indicator. It should be appreciated that the force applied to the blind will be a function of the design of the spring and the amount by which the spring has moved from a relaxed position Consequently, the dimensions of the indicator and attachment of the spring to the clamp block and the nature of the spring used in the clamping device may affect the number of turns of the hand screw, required to achieve the clamping position.

Figure 10:
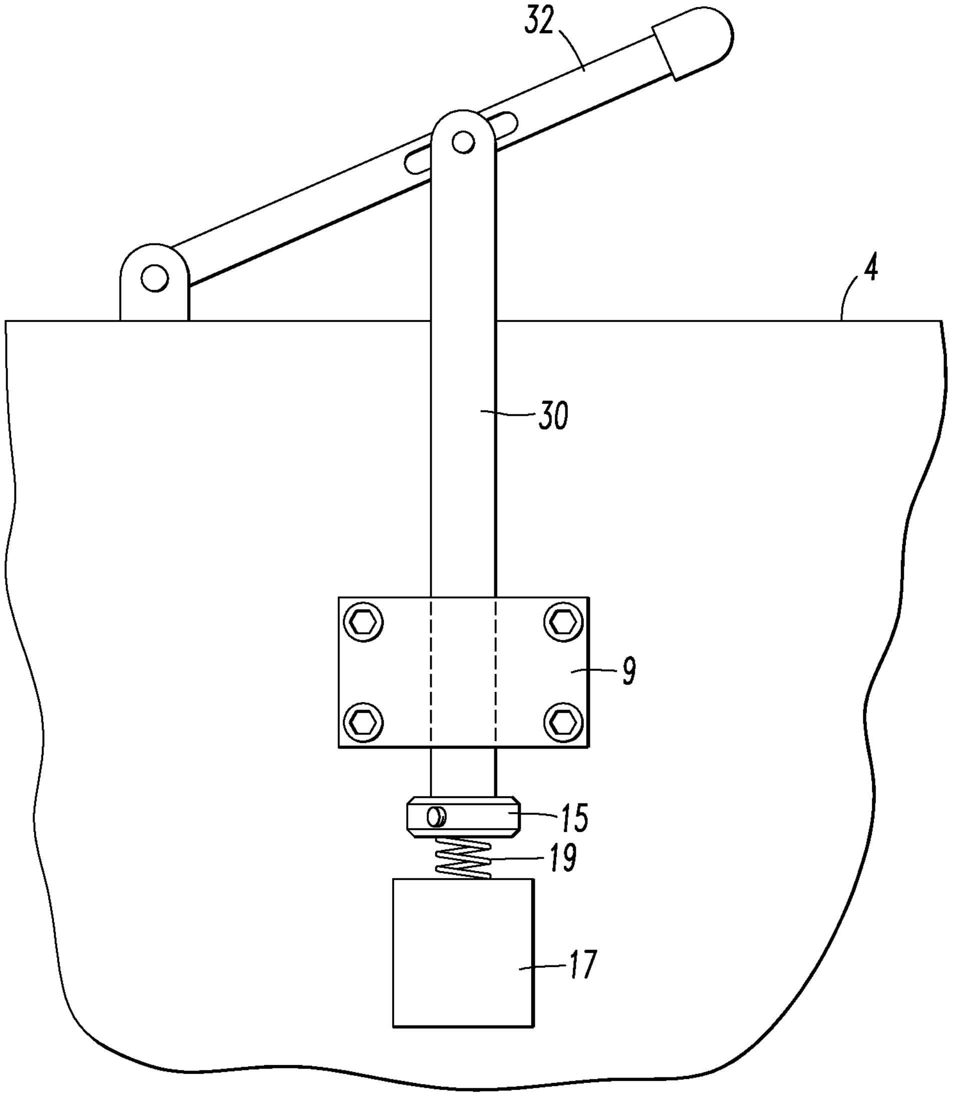
FIG. 10 is a front view of a second present preferred embodiment of our clamping device.

While we prefer to use a threaded shaft in our clamping device, other configurations could be used. For example, one may use a smooth rod or tube 30 which is connected to a handle 32 that is pivotably connected to the housing 4 of the cutting mechanism as shown in FIG. 10.

The clamping device 7 may be used to clamp a work piece which is a cellular shade, aluminum or vinyl venetian blind, pleated shade, and other blinds to be cut on the cut-down machine. However, a different cutting blade or even a cutting die would likely be used for at least some of these other blinds.

Figure 8:
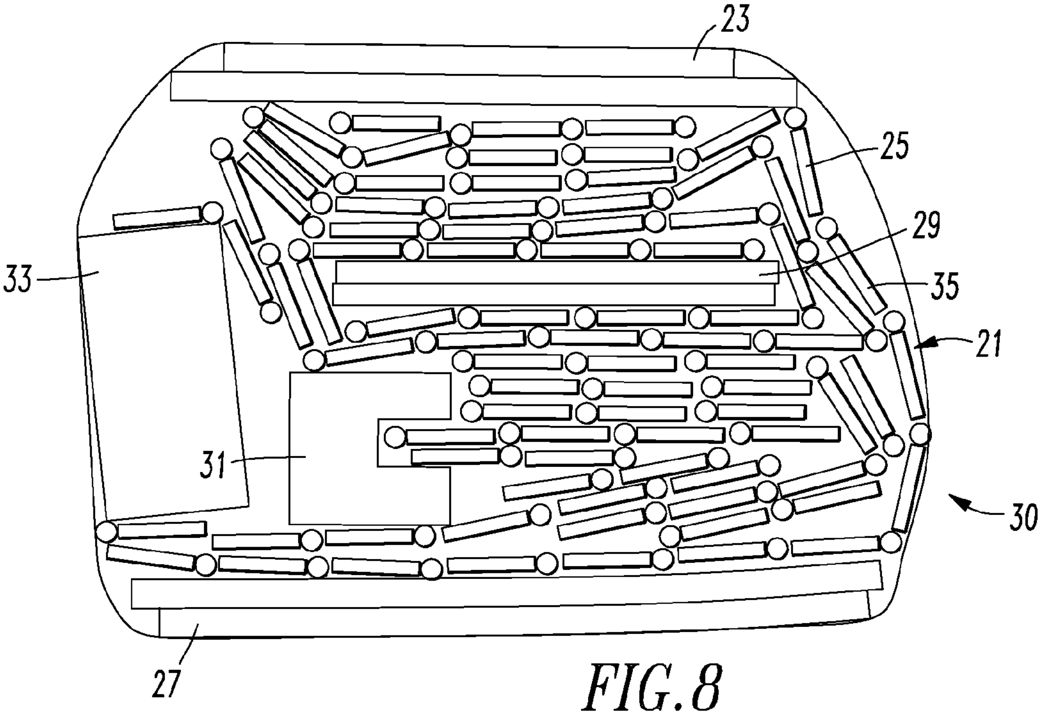
FIG. 8 is an end view of a first present preferred window covering folded into a stack for trimming.

We have found that cutting woven wood or woven grass blinds may be greatly improved with a substantial reduction of poorly cut material or cracked or split material by using one or more rigid cutting support members when trimming woven wood or woven grass blinds such as shown in FIG. 8. We provide a woven wood blind 21 may have a panel 25 composed of woven wood or woven grass. Prior to cutting the blind 21, the panel 25 of material is folded to form a stack 30. More likely, the blind will come from the factory folded in this manner. The blind usually will include a bottom rail 31 and a headrail 33 attached to the panel 25.

Prior to cutting, a first rigid cutting support member 23 is positioned on the top surface of the stack 30, a second rigid cutting support member 27 may be placed below the bottom surface of the stack and a third rigid cutting support member 29 may be positioned within the stack 30. While I prefer to use three different rigid cutting support members 23, 27 and 29, it has been determined that only one rigid cutting support member is needed on the top surface of the stack 30 to greatly improve the cut of woven wood and woven grass blinds. The other rigid cutting support members 27 and 29 have been found to further improve the cut. It is contemplated that more than three rigid cutting support members may be positioned within, on, below or otherwise adjacent the stack 30 to help improve the cutting of the blind 21. For example, additional rigid cutting support members may be placed within the stack 30 to help improve the cutting of the blind 21. The rigid cutting support members may be wooden slats, wood boards, faux wood slats, faux wood boards, or other relatively rigid beams, plates or boards.

Once the stack 30 is formed and the rigid cutting support members 23, 27 and 29 are positioned on, below and within the stack 30 the blind can be trimmed. The supports 23, 27 and 29 may be wrapped together with the stack 30 using tape, a strap, ribbon, cord or other flexible elongated member 35.

The wrapped stack 30 is cut by a cutting machine by placing the stack 30 on a window covering support surface, such as world surface 2 and positioned within an opening 6 in the cutting mechanism housing 4. Once the stack 30 is positioned within the opening 6, the clamp block 17 of the clamping device 7 is moved to the clamping position, as shown in FIGS. 2-4 to engage the first rigid cutting support member 23 on the top surface of the stack 30. After the clamp block 17 is in the clamping position, the blind 21 may be cut by the cutting device of the cutting mechanism 3. Preferably, the cutting device is a rotary blade 16.

Trimming of the blind 21 may occur by trimming only one end of the stack 30 or by cutting one end of the stack 30 and then repositioning the stack 30 in the opening 6 to cut the opposite end of the stack 30. Repositioning of the stack 30 includes unclamping the cut stack 30, moving the stack 30 so the uncut end of the stack 30 is positioned within an opening of a cutting mechanism, clamping the stack 30, and then cutting the uncut end of the stack 30.

Figure 9:
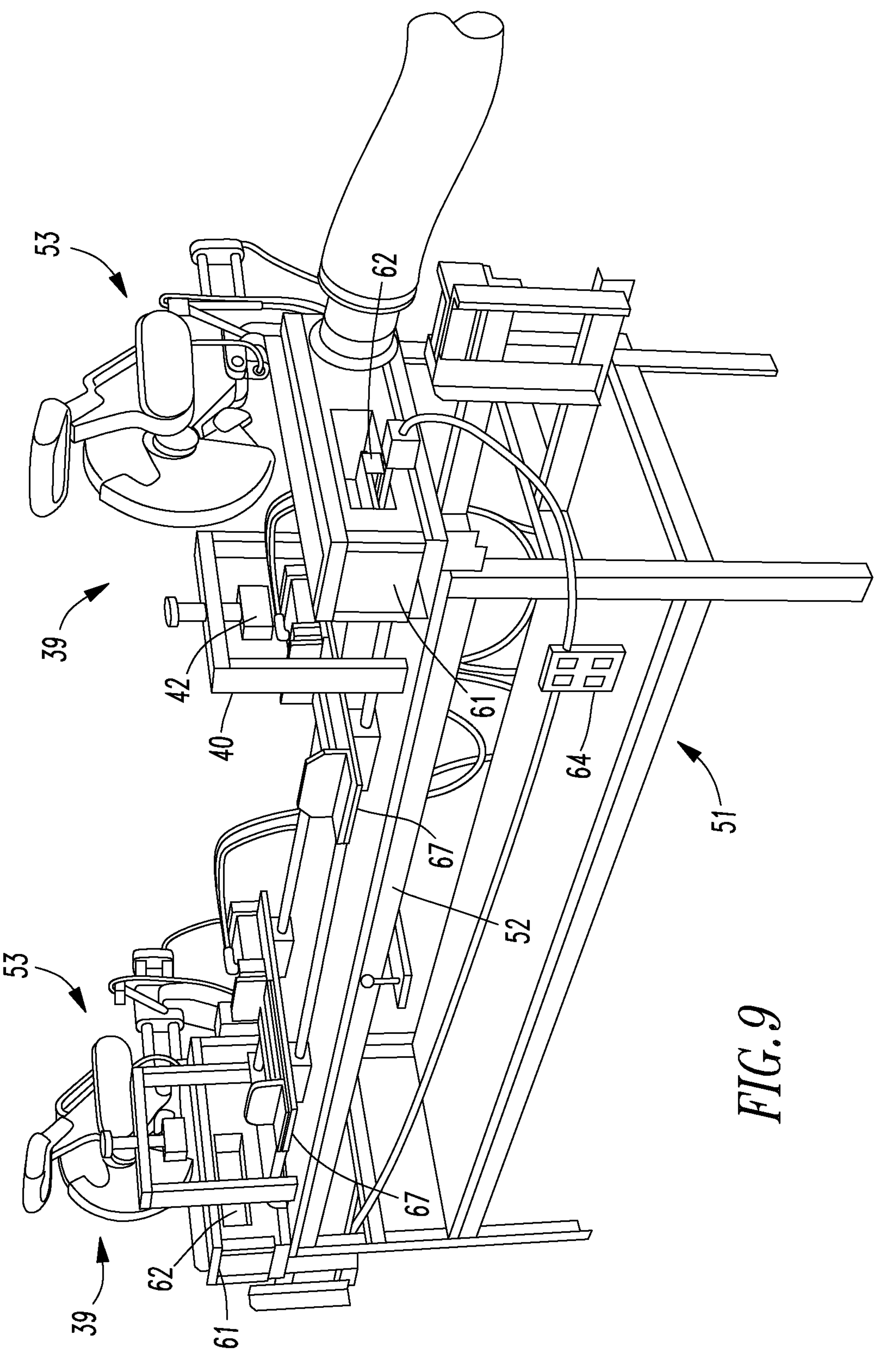
FIG. 9 is a perspective view of a second present preferred cutting machine.

The repositioning of the stack 30 for cutting both ends of the blind 21 may involve using only one cutting mechanism or moving the stack 30 to a second cutting mechanism. For example, a cutting machine 51 may include two cutting mechanisms 53, one positioned on each end of a support surface 52 as in the second embodiment of our cut-down machine 51 shown in FIG. 9. Each cutting mechanism 53 includes a housing 61 and an opening 62 formed in the housing 61. Window covering support surfaces 67 may be positioned on the support surface 52 such that the window covering support surfaces 67 are moveable along the support surface 52. A controller 64 may be connected to the window coveting support surfaces 67 to control movement of the window covering support surfaces 67. Clamping devices 39 are attached to the support surface 52 adjacent the opening 62 of each cutting mechanism 53. Each clamping device is similar to that shown in FIGS. 2 through 7. However, in this embodiment a clamp support 40 is attached to and extends above the frame 52 that contains movable window covering support surfaces 67. It is also contemplated that the clamp support may be connected directly to the window covering support surface.

A work piece or window covering, such as a blind 21 folded to form a stack 30, can be positioned on the window covering support surfaces 67 and moved along the support surface 52. One end of the blind may be cut by one cutting mechanism 53. The blind may then be moved to the opposite end of the support surface 52 to cut the opposite end of the blind with the other cutting mechanism 53.

Of course, variations of the present preferred embodiments discussed above may be made. For example, embodiments of my cutting machine can include multiple end stops configured to engage a portion of a window covering or work piece extending into a cutting mechanism. As another example, each cutting mechanism may be designed to include multiple cutting devices, such as multiple blades or cutting dies. As yet another example, multiple clamping devices may be positioned adjacent one or more openings of a cutting mechanism housing.

While we have shown and described certain present preferred embodiments of my window covering cutting machine and have illustrated certain present preferred methods of making and using the same, it is to be distinctly understood that the invention is not limited thereto but may be otherwise variously embodied and practiced within the scope of the following claims.

I claim:

1. A window covering cutting machine comprising:

- a cutting mechanism, the cutting mechanism having a housing that has at least one opening sized to receive at least a portion of a window covering;
- a window covering support surface adjacent the at least one opening;
- a clamp support positioned adjacent the at least one opening of the housing such that the clamp support is a fixed distance from the window covering support surface, the clamp support having an opening;
- a rod passing through the opening in the clamp support;
- a clamp block positioned adjacent one end of the rod, the clamp block moveable relative to the window covering support surface from an unclamped position to a clamping position;
- a spring having a first end and a second end opposite the first end, the first end of the spring connected to the rod and the second end of the spring engaging the clamp block such that when the spring is not fully compressed at least a portion of the spring is located between the rod and the clamp block and the spring is compressed when the clamp block is moved to the clamping position and the spring expands when the clamp block is moved out of the clamping position.

2. The window covering cutting machine of claim 1 also comprising an indicator connected to at least one of the rod and the clamp block.

3. The window covering cutting machine of claim 2 wherein the indicator is comprised of one of a ring, a collar and a disc.

4. The window covering cutting machine of claim 2 wherein the indicator is connected to the rod such that the indicator moves into engagement with the clamp block when the clamp block is moved to the clamping position and the indicator moves away from the clamp block when the clamp block is moved to the unclamped position.

5. The window covering cutting machine of claim 1 further comprising at least one end stop positioned adjacent the cutting mechanism, the at least one end stop being moveable to adjustably position the at least one end stop, the at least one end stop configured to brake dynamically to stop movement of the at least one end stop to position the at least one end stop.

6. The window covering cutting machine of claim 1 wherein the clamp support is attached to at least one of the window covering support surface, a frame carrying the window covering support surface and the housing of the cutting mechanism.

7. The window covering cutting machine of claim 1 wherein the rod is a threaded shaft.

8. The window covering cutting machine of claim 1 also comprising a handle connected to the rod.

9. The window covering cutting machine of claim 1 further comprising a spring seat positioned at least partially within the clamp block and wherein a first end of the spring is attached to the spring seat, the spring seat being movable relative to the clamp block.

10. The window covering cutting machine of claim 1 further comprising a window covering carrier positioned on the window covering support surface for movement over the support surface.

* * * * *